(12) United States Patent
Yoshimura et al.

(10) Patent No.: US 6,706,103 B2
(45) Date of Patent: Mar. 16, 2004

(54) WATER-BASED METALLIC INK COMPOSITION AND WRITING INSTRUMENT USING SAME

(75) Inventors: Yasuyuki Yoshimura, Ibaragi (JP); Naoshi Murata, Higashiosaka (JP)

(73) Assignee: Sakura Color Products Corp., Osaka (JP)

( * ) Notice: Subject to any disclaimer, the term of this patent is extended or adjusted under 35 U.S.C. 154(b) by 0 days.

(21) Appl. No.: 09/729,022

(22) Filed: Dec. 4, 2000

(65) Prior Publication Data

US 2001/0003262 A1 Jun. 14, 2001

(30) Foreign Application Priority Data

Dec. 2, 1999 (JP) ........................................ 1999-342981

(51) Int. Cl.$^7$ .............................................. C09D 11/16
(52) U.S. Cl. .................... 106/31.6; 106/31.86
(58) Field of Search .................... 106/31.6, 31.86

(56) References Cited

U.S. PATENT DOCUMENTS

| | | | | |
|---|---|---|---|---|
| 4,490,177 A | * | 12/1984 | Shioi et al. | 106/1.05 |
| 4,545,819 A | * | 10/1985 | Shioi et al. | 106/1.05 |
| 4,604,139 A | * | 8/1986 | Shioi et al. | 106/1.05 |
| 4,657,591 A | * | 4/1987 | Shioi et al. | 106/31.57 |
| 6,120,590 A | * | 9/2000 | Miyamoto et al. | 106/31.6 |
| 6,422,776 B1 | * | 7/2002 | Nakatani | 401/209 |

FOREIGN PATENT DOCUMENTS

JP 63-72771 * 4/1998

* cited by examiner

*Primary Examiner*—Mark L. Bell
*Assistant Examiner*—Veronica F. Faison
(74) *Attorney, Agent, or Firm*—Howard C. Miskin, Esq.; Gloria Tsui-Yip, Esq.

(57) ABSTRACT

The invention provides a water-based metallic ink composition comprising a metallic powder pigment and a solvent characterized by its further comprising a polyvinyl alcohol. This composition provides a record consisting of a central line derived from a formulated colorant or the color of the writing substrate and contour lines derived from the metallic powder pigment and bordering on both sides of the central line.

18 Claims, 1 Drawing Sheet

WATER-BASED METALLIC INK COMPOSITION AND WRITING INSTRUMENT USING SAME

FIELD OF THE INVENTION

The present invention relates to a water-based metallic ink composition and a writing instrument using the same.

BACKGROUND OF THE INVENTION

The two-tone ink (double color ink), when writing is made with it, gives a two-tone color record consisting of a drawn line and a contour line bordering on either side thereof, thus enabling creation of variegated designs which cannot be realized with ordinary ink.

Heretofore known as the two-tone ink is a two-tone color ink composition comprising a metallic powder pigment, a water-soluble dye, water and a diffusible organic solvent for writing on a solvent-receptive substrate such as paper or cloth wherein the water-soluble dye penetrates into the substrate and diffuses around the drawn line derived from the metallic powder pigment to form colored borderlines (Japanese Unexamined Patent Publications 231777/1985, 123684/1986).

Two-tone color inks of this kind invariably depend on the dual coloration mechanism illustrated in FIG. 1 and the current main stream of the two-tone color ink composition employs two kinds of coloring matters, one penetrating into the substrate, e.g. paper, and the other not penetrating into the substrate, namely a water-soluble dye and a metallic powder pigment. Shown in FIG. 1 is a sectional elevation of the record. After writing, the water-soluble dye penetrates into the paper while the metallic powder pigment is deposited on the surface of the paper to give a two-tone record consisting of a central line derived from the metallic powder pigment and contour lines derived from the water-soluble dye and bordering on both sides of said central line (in the case of seeing the record).

SUMMARY OF THE INVENTION

In regard of drawn line records of this type, the recently diversified design needs call for the development of inks with which further unique lines can be written. For example, there exists a demand for written lines having borderlines comprised of a metal powder pigment, particularly a drawn record consisting of a central line derived from a colorant and contour lines derived from a metallic powder pigment and bordering on both sides of said central line.

However, with the conventional two-tone ink composition, all that can be drawn is a record consisting of a central line derived from a metallic powder pigment and a contour line derived from a water-soluble dye and bordering on either side of said central line, and there has not been developed an ink composition with which said new type of line can be drawn.

An object of the invention is to provide a water-based metallic ink composition which can give a record consisting of a central line derived from a formulated colorant and contour lines derived from the metallic powder pigment and bordering on both sides of the central line.

After an intensive investigation to overcome the drawbacks of the prior art, the present inventor found that an ink composition according to a herein-defined formulation accomplishes the above object and have perfected the present invention.

The present invention, therefore, is directed to a water-based metallic ink composition comprising a metallic powder pigment and a solvent characterized by its further comprising a poly(vinyl alcohol).

The present invention is further directed to a writing instrument using said water-soluble metallic ink composition.

The present invention is directed to a method of producing a record consisting of 1) a colorless or colored central line and 2) a contour line (contour lines) derived from a metallic powder pigment and bordering on either side (both sides)of said central line which comprises writing with the ball-point pen mentioned above.

DETAILED DESCRIPTION OF THE INVENTION

Figure 1:
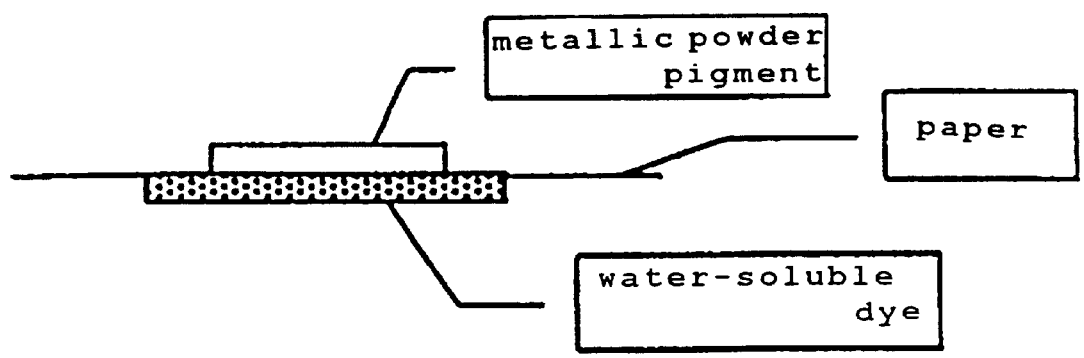
FIG. 1 is a schematic view (cross-section view) showing the two-tone record according to the prior art.

The water-based metallic ink composition of the present invention is an ink composition comprising a metallic powder pigment and a solvent characterized in that it further comprises a poly(vinyl alcohol) (PVA). By formulating a poly(vinyl alcohol) (PVA) as an essential component of the ink composition, a line record having contour lines comprised of a metallic powder pigment can be obtained and, at the same time, the shelf-life of the ink composition can be prolonged.

Referring to the polyvinyl alcohol) for use in the present invention, a known species or a commercial product can be used as it is, regardless of its production process. As the PVA, any of the completely saponified PVA, medium-saponified PVA, and partially saponified PVA can be used. Particularly when the solvent is a water-soluble organic solvent, it is preferable to use at least one of the medium-saponified PVA and partially saponified PVA as an essential component. The degree of polymerization of PVA is not particularly restricted but may usually be about 500~2000.

The PVA content of the ink composition can be judiciously selected according to the grade and degree of polymerization of PVA and the kinds of other components used but may usually be about 5~20 weight %, preferably 10~15 weight %, based on the total ink composition. When the proportion exceeds 20 weight %, the ink viscosity is increased to the extent of interfering with writing or printing. When the proportion is less than 5 weight %, the contour lines derived from a metallic powder pigment cannot be obtained and the shelf-life of the ink composition tends to be sacrificed.

The metallic powder pigment is not particularly restricted insofar as it has a metallic gloss, and may for example be an aluminum pigment or a brass pigment. The aluminum pigment includes "Alpaste WJP-U75C", "Alpaste WE1200", "Alpaste WXM7675" and "Alpaste WXM0630" (all manufactured by Toyo Aluminum Co.); "111OW" and "2172SW" (both manufactured by Showa Aluminum Co.); and "AW-808C" and "AW7000R" (both manufactured by Asahi Kasei Kogyo Co.), among others. The brass pigment includes "BS-605" and "BS-607" (both manufactured by Toyo Aluminum Co.), "Bronze Powder P-555" and "Bronze Powder P-777" (both manufactured by Nakajima Metal Foil Industry, Co.). Colored aluminum pigments such as "F500-RG", "F500BG-W", "F701GF-W" and "F701RE-G" (all manufactured by Showa Aluminum Co.) can also be used. These pigments can be used independently or two or more of them can be used in a suitable combination. The particle diameter of such a metallic powder pigment can be judiciously selected according to the kind of pigment.

Among such metallic powder pigments, those subjected to waterproofing treatment are preferred. The waterproofing treatment can be carried out by the conventional technique and the pigment treated with a phosphoric acid-containing solution can be used. Even a commercial product may also be used. The commercial product may for example be said "Alpaste WXM0630" (Toyo Aluminum Co.).

To mention a preferred example, there can be used an aluminum flake pigment composition for water-based coating (Japanese Unexamined Patent Publication 54475/1988) which comprises aluminum flakes, 500~10000 ppm of P as supplied from an inorganic phosphoric acid compound (one or more members selected from among orthophosphoric acid, pyrophosphoric acid, triphosphoric acid, tetraphosphoric acid, phosphorous acid, etc.), 0.3~5 weight parts, based on 100 weight parts of aluminum, of one or more aliphatic compounds (preferably containing 8~50 carbon atoms each) having at least one functional group per molecule (for example, an aliphatic amine such as 2-ethylhexylamine, caprylamine, decylamine, laurylamine, myristylamine, palmitylamine, stearylamine, oleylamine, etc.; an aliphatic alcohol such as lauryl alcohol, stearyl alcohol, etc.; an aliphatic amide such as oleylamide, stearylamide, etc., a fatty acid ester such as methyl oleate, butyl stearate, etc., a fatty acid metal salt such as sodium laurate, calcium oleate, etc., an orthophosphoric ester such as dilauryl acid phosphate, etc.), 0.05~10 weight parts of water, 5~100 weight parts of a water-soluble alcohol (one or more members selected from among ethanol, isopropyl alcohol, isobutyl alcohol, isoamyl alcohol, ethylcellosolve, butylcellosolve, polyoxyethylene glycol, polyoxypropylene glycol, etc.), and 1~70 weight parts of a hydrocarbon oil (one or more of mineral spirit, solvent naphtha, etc.).

The metallic powder pigment content of the ink composition of the invention can be judiciously selected according to the kind of pigment but usually is preferably about 4~15 weight % (as metal powder), particularly 5~10 weight % (as metal powder) of the total ink composition. When the metal powder content exceeds 15 weight %, the proportion of solids is so large that the viscosity or fluidity of the composition tends to be adversely affected. When it is less than 4 weight %, the metallic powder pigment will not express a sufficient hiding power so that the two-tone feature may not be attained. In the present invention, therefore, the metal powder can be properly formulated in a proportion of about 4~15 weight % of the ink composition.

As typical example of the solvent, water can be mentioned. The solvent to be used is not particularly restricted inasmuch as it is capable of dispersing the metal powder pigment and colorant. As typical examples of the solvent, water, a water-soluble organic solvent etc. can be mentioned. Usually, when water is used as a component of the solvent system, a water-soluble organic solvent can be employed together with water. The water-soluble solvent is not particularly restricted but can be selected from the known or commercial solvents. Thus, monohydric alcohols such as methanol, ethanol, propanol, butanol, etc.; glycols such as ethylene glycol, propylene glycol, etc.; glycol ethers such as diethylene glycol monomethyl ether, dipropylene glycol monomethyl ether, diethylene glycol monopropyl ether, etc.; and polyhydric alcohols such as glycerin, trimethylolpropane, etc. can be mentioned. These can be used independently or two or more of them may be used in a suitable combination. Among these water-soluble organic solvents, glycol ethers are particularly preferred for the purposes of the present invention. Stated differently, a solvent system comprising water and a glycol ether can be used with advantage.

The proportion of the solvent (when water is contained, the total amount of the solvent and water) can be liberally selected according to the quantity of water used and the kind of water-soluble organic solvent but usually is about 50~95 weight %, preferably 60~90 weight %, based on the total ink composition of the invention. When the solvent content of the composition is less than 50 weight %, the dispersibility tends to be reduced and/or the solubility of PVA be decreased. When the solvent content exceeds 95 weight %, such disadvantages as an insufficient density of the drawn line and a reduced drying speed of the ink laid down on the substrate are encountered.

In the present invention, a colorant can be optionally formulated. When a colorant is not used, writing with the ink composition of the present invention produces a record consisting of contour lines derived from the metallic powder pigment; that is to say a record consisting of a colorless centerline (usually the exposed paper surface) and contour lines derived from the metallic powder pigment. In contrast, when a colorant is formulated, writing gives a record consisting of a colored centerline derived from the colorant and contour lines derived from the metallic powder pigment. Thus, with the ink composition of the present invention, a record consisting of (1) either a colorless centerline or a colored centerline and (2) a pair of contour lines bordering on both sides of the centerline can be drawn.

Provided that it is not a metallic powder pigment, the colorant is not particularly restricted and may for example be a known and/or commercial dye or pigment. Regarding the dye, water-soluble dyes in the carbonium, metal complex, triphenylmethane, xanthene, and anthraquinone series, among others, can be used with advantage. As to the pigment, whichever of inorganic and organic pigments can be employed. Thus, as typical examples, phthalocyanine, quinacridone, and carbon, among others, can be mentioned. Furthermore, a fluorescent pigment, a colored emulsion or a pigment dispersion can likewise be used as said pigment.

Among these colorants, it is preferable to use at least one member selected from the group consisting of triphenylmethane dye, xanthene dye, anthraquinone dye and metal complex dye. The triphenylmethane dye includes but is not limited to C. I. Acid Blue 90, C. I. Acid Green 16, C. I. Acid Violet 49, C. I. Basic Red 9, C. I. Basic Blue 7, C. I. Acid Violet 1, C. I. Direct Blue 41, C. I. Mordant Blue 1 and C. I. Mordant Violet 1. The xantene dye includes but is not limited to C. I. Acid yellow 74, C. I. Acid Red 52, C. I. Acid Violet 30, C. I. Basic Red 1, C. I. Basic Violet 10, C. I. Mordant Red 27 and C. I. Mordant Violet 25. The anthraquinone dye may be any dye having an anthraquinone skeleton (chemical structure), thus including anthraquinone derivatives and anthrone derivatives. Thus, for example, C. I. Acid Blue 27, C. I. Acid Blue 43, C. I. Acid Green 25, C. I. Basic Violet 25, C. I. Basic Blue 60, C. I. Mordant Red 11, C. I. Acid Red 83, C. I. Direct Green 28 and C. I. Mordant Blue 48 can be used. The metal complex dye includes not only metal complex dyes but also metal-containing dyes and dyes capable of coordinating with metals. The dyes which may coordinate with metals include azo dyes having —OH, —COOH or —NH$_2$ groups, among others. As specific examples, C. I. Mordant Red 30, C. I. Mordant Yellow 3, C. I. Mordant Green 15, C. I. Mordant Blue 13, etc. can be mentioned.

The preferred, among such metal complex dyes, are the copper-phthalocyanine dye, 1:1 metal complex dye, and 1:2 metal complex dye. Specifically, the copper-phthalocyanine dye includes C. I. Direct Blue 86, among others; the 1:1 metal complex dye includes C. I. Acid Yellow 54, C. I. Acid Orange 74, C. I. Acid Red 186, C. I. Acid Violet 56, etc.; and the 1:2 metal complex dye includes C. I. Acid Yellow 59, C. I. Acid Black 60, C. I. Acid Red 296 and C. I. Acid Blue 167.

The colorant content of the ink composition can be judiciously selected according to the type of colorant but may usually be about 0.05~15 weight %, preferably 1~10 weight %. When the proportion of the colorant exceeds 15 weight %, the viscosity or fluidity of the ink tend to be adversely affected. When the proportion is smaller than 0.05 weight %, the desired color may not be well expressed.

In the present invention, a water-soluble resin other than PVA may also be formulated within the range not detracting from the effect of the invention. The water-soluble resin is not particularly restricted inasmuch as it is capable of thickening and/or imparting adhesivity to a water-based ink and can be judiciously selected according to the intended use of the ink. Thus, said resin includes water-soluble polysaccharides of animal origin or derivatives thereof, such as gelatin and casein; cellulose derivatives, e.g. sodium or ammonium salts of celluloses such as hydroxyethylcellulose, carboxymethylcellulose (CMC), hydroxypropylcellulose, etc., starch and starch derivatives, such as starch, cationic starch, dextrin, starch sodium glycolate, etc.; synthetic vinyl polymers such as polyvinylpyrrolidone, poly(vinyl ether), etc.; synthetic acrylic polymers such as poly(sodium acrylate), carboxyvinyl polymer, etc.; and other synthetic polymers such as poly(ethylene oxide), poly(methoxyethylene-co-maleic acid), etc. can be mentioned. These substances can be used independently or two or more of them can be used in a suitable combination.

The water-soluble resin content of the ink composition can be judiciously selected according to the type of water-soluble resin and is usually about 0.05~40 weight %, preferably 0.1~30 weight %.

In the ink composition of the present invention, various known additives may also be formulated within the range not detracting from the effect of the invention. Among such additives are lubricants such as polyoxyethylene alkali metal salts, dicarboxylic acid amides, phosphoric acid esters, N-oleylsarcosine salts, etc.; wetting agents such as polyhydric alcohols and derivatives thereof (e.g. glycerin); rust inhibitors such as benzotriazole, tolyltriazole, dicyclohexylammonium nitrate, etc.; antiseptic-antifungal agents such as benzoisothiazolines, pentachlorophenols, cresol, etc.; and various dispersants, surfactants and dye solubilizers.

The ink composition of the present invention may contain alkali metal salts such as NaCl, $Na_2SO_4$, etc. in some instances and, in such cases, the total concentration of alkali metal salts in the ink composition is preferably not more than 1 weight %. By adjusting the alkali metal salt content (particularly at least one of NaCl and $Na_2SO_4$), the salting-out of the water-soluble organic solvent or the like in the ink composition can be prevented and a longer shelf-life can be obtained. The method for adjusting the amount of alkali metal salts is not particularly restricted. In the case of a dye, this can be effected by removing the alkali metal partially or completely using methanol, ethanol or the like. When the initial alkali metal salt content is 0~1 weight %, the composition can be used as it is.

The viscosity of the ink composition of the present invention is not particularly restricted. However, when the composition is used as the ink for an aqueous ball-point pen, it is usually preferable that the viscosity measured with an ELD viscometer under the conditions of 3° (R14) cone, 0.5 rpm (at 20° C.) is within the range of about 1000~10000 mPa·s. When the ink viscosity is controlled with this range, a long life and a high writing quality can be insured for aqueous ball-point pens. The ink viscosity can be adjusted with a water-soluble resin or water, for instance.

When the ink composition of the present invention is used as an aqueous ball-point pen ink, the pH of the composition is preferably controlled within the range of about 5~10. By controlling the pH within the above range, a good shelf-life can be insured. The pH can be adjusted with a known pH control agent such as sodium hydroxide, triethanolamine or the like. The term "pH" as used in this specification is a value measured with a pH meter at 20° C.

The ink composition of the present invention can be produced by the known sequence of dispersion, degassing, and filtration. The basic production protocol comprises blending water, a colorant and a metallic powder pigment under stirring, adding PVA (water-soluble resin), further adding a water-soluble organic solvent, optionally as well as various additives, and adjusting the pH of the mixture with a known pH control agent such as sodium hydroxide or triethanolamine. The blending/stirring operation in each stage can be carried out using a known stirring machine such as a dissolver, a mixer, a kneader or the like.

The ink composition of the present invention can be used as the ink for various writing instruments, such as markers, sign pens and ball-point pens. It is used with advantage particularly as the ink for aqueous ball-point pens. For the manufacture of the writing instrument according to the present invention, the component parts of the known writing utensils (markers, ball-point pens, etc.) can be judiciously and selectively utilized.

In the case of an aqueous ball-point pen, the ink housing may be of the known material and capacity (size). For example, a polyethylene, polypropylene or other synthetic resin pipe can be employed. A metal pipe may also be utilized. The assembling of a ball-point pen may also be carried out in the conventional manner.

The tip of the ball-point pen may also be of the conventional material and geometry for water-based ball-point pens. Particularly preferred for the ink composition of the present invention is a tip such that the difference between the diameter of the ball and the inner diameter of the ball housing is generally not less than 0.03 mm, particularly 0.03~0.04 mm. In the context of the present invention, the above difference is relevant to the distance in the position where the clearance between the ball and the inner surface of the ball housing is closest. The difference between the diameter of the ball and the inner diameter of the ball housing in the conventional ball-point pen (ball-point pen tip) is usually about 0.01~0.02 mm. In the present invention, however, by providing a large difference of not less than 0.03 mm, the unique color effect of the invention can be obtained with greater certainty.

With the water-based metallic ink composition and associated writing instrument according to the present invention, a color expression different from the conventional color effect can be obtained.

Figure 2:
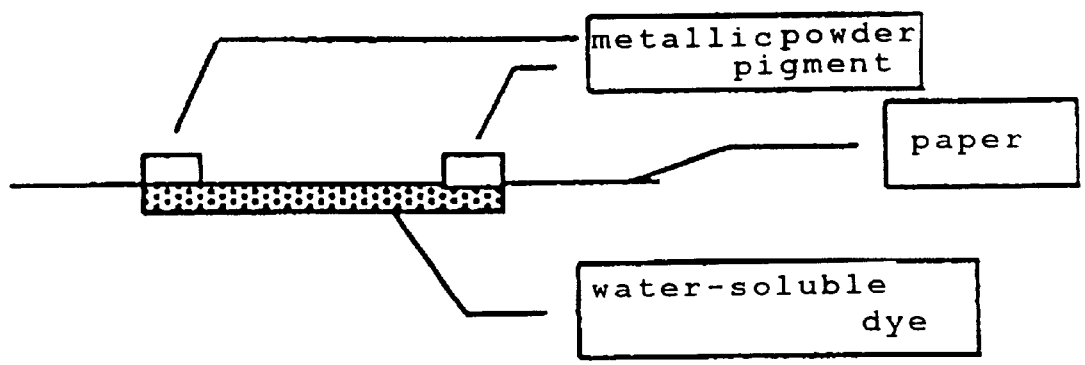
FIG. 2 is a schematic view (cross-section view) showing the record obtained by writing with the ink composition of the present invention.

Thus, a record consisting of 1) a colorless or colored central line and 2) contour lines derived from a metallic powder pigment and bordering on both sides of said central line can be obtained. Particularly when a colorant is formulated, a two-tone record consisting of a colored central line derived from the colorant and contour lines (borderlines) derived from a metallic powder pigment and extending in parallel with said central line can be obtained. More particularly, as illustrated in FIG. 2, a record consisting of a colored central line (when a colorant is used) and a pair of contour lines derived from a metallic powder pigment (that is to say, trimming lines having a metallic gloss) can be obtained. This effect is the reverse of the effect of the prior art two-tone ink in the relative position of the central line and two contour lines.

Furthermore, the ink composition of the present invention is capable of providing the desired color effect even after prolonged storage, thus enjoying a longer shelf-life.

The ink composition of the present invention finds application in a variety of writing instruments and is particularly useful as an aqueous ball-point pen ink. Furthermore, by using a ball-point pen tip having a herein-defined geometry, the optimum ink delivery can be obtained for the ink composition of the present invention so that the expected color effect can be realized with certainty.

EXAMPLES

The following working and comparative examples illustrate the outstanding features of the present invention in further detail. It should, however, be understood that the scope of the present invention is by no means defined by the specific examples.

Examples 1~3 and Comparative Examples 1~3

Inks were prepared according to the formulations indicated in Table 1. First, the water-soluble dye, the metallic powder pigment and water were blended in the predetermined proportions, followed by addition of the water-soluble resin, and the mixture was stirred at room temperature for 1 hour. Then, the colorant, as well as the optional water-soluble organic solvent and other additives, were added and the whole mixture was stirred at room temperature for 1 hour to give an ink composition.

The component materials indicated in Table 1 are as follows.

(1) Flaky pigment (metallic powder pigment)
Flaky pigment 1: aluminum powder pigment ("Alpaste WXM0630", manufactured by Toyo Aluminum Co.) (leafing type, average particle diameter 8 μm, aluminum powder ca 55~56 weight %)
Flaky pigment 2: aluminum powder pigment ("Alpaste WXM7675", manufactured by Toyo Aluminum Co.) (non-leafing type, average particle diameter 15 μm, aluminum powder ca 65 weight %)

(2) Water-soluble resin
Water-soluble resin 1: polyvinyl alcohol ("PVA-417", manufactured by Kuraray Co., partially saponified grade)
Water-soluble resin 2: polyvinyl alcohol ("PVA-103", manufactured by Kuraray Co., completely saponified grade)
Water-soluble resin 3: poly(ethylene oxide) ("PEO-3", manufactured by Sumitomo Kasei Co.)
Water-soluble resin 4: xanthan gum ("Kelzan", manufactured by Sansho Co.)

(3) Solvent
Solvent 1: dipropylene glycol monomethyl ether (reagent grade)
Solvent 2: hexylene glycol (reagent grade)
Solvent 3: ethylene glycol (reagent grade)
Solvent 4: dipropylene glycol (reagent grade)

(4) Colorant
Colorant 1: yellow dye ("Tartrazine NS Conc.", manufactured by Sumitomo Chemical Co.; C. I. Acid Yellow)
Colorant 2: blue dye ("Milling Cyanine", manufactured by Sumitomo Chemical Co.; C. I. Acid Blue)

(5) Additives
Antiseptic-antifungal agent: 1,2-benziso-thiazolin-3-one, ("Proxcel GXL", manufactured by Hoechst Gosei)
Rust inhibitor: benzotriazole (reagent grade)
Lubricant: maleic acid monoamide (reagent grade)

Test Example 1

Each of the ink compositions (weight %) shown in Table 1 was filled into a polypropylene ink tube attached to one end of a stainless steel ball tip (ball material: hard metal) for use as a core piece. The core piece was set in a pen body and a tail cap was affixed. Finally, the air in the core piece tube was removed by centrifugation to provide a ball-point pen.

Each ball-paint pen was evaluated for shelf-life (storage stability) and two-tone effect (by handwriting with the ink prior to storage). The shelf-life was evaluated by storing the test pen at 50° C. for 1 month and visually assessing the degree of change in color of the record (on commercial looseleaf paper) due to storage. The case in which no change in hue was observed was rated "O" and the case in which a change in hue was observed was rated "x". The results are shown in Table 1.

TABLE 1

| | | Example 1 | Example 2 | Example 3 | Compar. Ex. 1 | Compar. Ex. 2 | Compar. Ex. 3 |
|---|---|---|---|---|---|---|---|
| Flaky pigment | 1 | 10.0 | | | 10.0 | 10.0 | |
| | 2 | | 10.0 | | | | 10.0 |
| Water-soluble resin | 1 | 12.0 | 15.0 | | | | |
| | 2 | | | 12.0 | | | |
| | 3 | | | | 15.0 | | |
| | 4 | | | | | 0.3 | 0.3 |
| Solvent | 1 | 24.0 | | | 20.0 | | |
| | 2 | | 18.0 | | | 15.0 | |
| Colorant | 1 | 2.0 | | | | | |
| | 2 | | 2.0 | | 2.0 | 2.0 | |
| Antiseptic-antifungal agent | 1 | 0.4 | 0.4 | 0.4 | 0.4 | 0.4 | 0.4 |
| Rust inhibitor | 1 | 0.4 | 0.4 | 0.4 | 0.4 | 0.4 | 0.4 |
| Water | | 51.2 | 54.2 | 77.2 | 52.2 | 71.9 | 88.9 |
| Total | | 100.0 | 100.0 | 100.0 | 100.0 | 100.0 | 100.0 |
| Shelf-life | | O | O | O | x | O | O |
| Two-tone effect | | O | O | O | O | x | x |

In Example 1, a two-tone line record consisting of a yellow central line and silver-colored (metallic) contour lines was obtained. In Example 2, a two-tone record consisting of a blue central line and silver-colored (metallic) contour lines was obtained. In Example 3, a record having contour lines derived from the metallic powder pigment, that is to say a record consisting of a ground (exposed paper surface)-colored central line and silver-colored (metallic) contour lines, was obtained.

In contrast, in Comparative Example 1, a line similar to the record in Example 2 could be drawn but with the ink after storage, writing was difficult because of precipitation of the flaky pigment. In Comparative Example 2, only the conventional two-tone line consisting of a silver-colored central line and blue-colored contour lines could be obtained. In Comparative Example 3, no contour lines of metallic powder pigment could be drawn but only a silver-colored line was obtained.

What is claimed is:

1. A water-based metallic ink composition comprising a metallic powder pigment, solvent and a polyvinyl alcohol, wherein writing with the water-based metallic ink composition gives a record comprising 1) a colorless or colored central line and 2) contour lines derived from the metallic powder pigment and bordering on both sides of said central line.

2. A water-based metallic ink composition as claimed in claim 1 further comprising a colorant.

3. A water-based metallic ink composition comprising a metallic powder pigment, solvent, a polyvinyl alcohol and a colorant wherein the colorant is at least one me ber selected from the group consisting of a triphenylmethane dye, a xanthene dye, an anthraquinone dye and a metal complex dye.

4. A water-based metallic ink composition as claimed in claim 1 wherein the solvent contains a water-soluble organic solvent.

5. A water-based metallic ink composition as claimed in claim 1 wherein the solvent is a glycol ether.

6. A writing instrument comprising the ink composition of claim 1 as its ink component.

7. A writing instrument as claimed in claim 6 which is a ball-point pen.

8. A writing instrument as claimed in clam 7 wherein the difference between the diameter of the ball and the inner diameter of the ball housing is 0.03–0.04 mm.

9. A method of producing a record consisting of 1) a colorless or colored central line and 2) contour lines derived from a metallic powder pigment and bordering on both sides of said central line which comprises writing with the ball-point pen of claim 7 or 8 on a paper surface.

10. A water-based metallic ink composition as claimed in claim 1 wherein the PVA content is about 5–20 weight % based on the total ink composition.

11. A water-based metallic ink composition as claimed in claim 3, wherein writing with the water-based metallic ink composition gives a record consisting of 1) a colorless or colored central line and 2) contour lines derived from the metallic powder pigment and bordering on both sides of said central line.

12. A water-based metallic ink composition as claimed in claim 3, wherein the solvent contains a water-soluble organic solvent.

13. A water-based metallic ink composition as claimed in claim 3, wherein the solvent is a glycol ether.

14. A writing instrument as claimed in claim 13, which is a ball-point pen.

15. A writing instrument as claimed in claim 14, wherein the difference between the diameter of the ball and the inner diameter of the ball and the inner diameter of the ball housing is 0.03–0.04 mm.

16. A method of producing a record comprising 1) a colorless or colored central line and 2) contour lines derived from a metallic powder pigment and bordering on both sides of said central line which comprises writing with the ball-point pen of claim 14 or 15 on paper surface.

17. A water-based metallic ink composition comprising a metallic powder pigment, a solvent and a polyvinyl alcohol, wherein writing with the water-based metallic ink composition gives a record comprising 1) a colorless or colored central line and 2) contour lines derived from the metallic powder pigment and bordering on both sides of said central line and wherein the polyvinyl alcohol content is about 5–20 weight % based on the total ink composition.

18. A water-based metallic ink composition comprising a metallic powder pigment, a solvent, a polyvinyl alcohol, and a colorant wherein the colorant is at least one member selected from the group consisting of triphenylmethane dye, a xanthene dye, an anthraquinone dye, and a metal complex dye and wherein the polyvinyl alcohol content is about 5–20 weight % based on the total ink composition.

* * * * *